(12) United States Patent
Rönngren

(10) Patent No.: US 10,712,817 B1
(45) Date of Patent: Jul. 14, 2020

(54) IMAGE RE-PROJECTION FOR FOVEATED RENDERING

(71) Applicant: Tobii AB, Danderyd (SE)

(72) Inventor: Denny Alexander Rönngren, Danderyd (SE)

(73) Assignee: Tobii AB, Danderyd (SE)

(*) Notice: Subject to any disclaimer, the term of this patent is extended or adjusted under 35 U.S.C. 154(b) by 0 days.

(21) Appl. No.: 16/455,225

(22) Filed: Jun. 27, 2019

(51) Int. Cl.
*G06F 3/01* (2006.01)
*G09G 5/37* (2006.01)

(52) U.S. Cl.
CPC ............ *G06F 3/013* (2013.01); *G09G 5/37* (2013.01); *G09G 2320/066* (2013.01); *G09G 2340/0407* (2013.01); *G09G 2354/00* (2013.01)

(58) Field of Classification Search
CPC ........ G06F 3/013; G06F 3/0304; G06F 3/012; G09G 5/37; G09G 2320/066; G09G 2340/0407; G09G 2354/00; G02B 27/0101; G02B 27/0093; G02B 27/0172; G02B 27/017; G02B 2027/0187; H04N 21/4318; H04N 21/44218; H04N 21/4728; H04N 21/44008; H04N 21/4223; G06T 11/00; G06T 11/60
See application file for complete search history.

(56) References Cited

U.S. PATENT DOCUMENTS

2018/0227630 A1* 8/2018 Schmidt ............. H04N 21/4318
2019/0005735 A1   1/2019 Ronngren
2019/0339770 A1* 11/2019 Kurlethimar ...... G02B 27/0101

* cited by examiner

*Primary Examiner* — Ke Xiao
*Assistant Examiner* — Andrew Shin
(74) *Attorney, Agent, or Firm* — Kilpatrick Townsend & Stockton LLP

(57) ABSTRACT

Technologies for improving foveated rendering of an image by improving the position of the image to be displayed through image re-projection are disclosed. For example, a method may include receiving a first estimation of a predicted gaze point of a user on a display device that is determined before starting rendering a high-quality portion of the image. The method may further include causing the image to be rendered based on the first estimation of the predicted gaze point. The method may also include receiving a second estimation of the predicted gaze point. The second estimation of the predicted gaze point is determined after rendering of the high-quality portion of the image has started. Responsive to determining that the second estimation of the predicted gaze point is different from the first estimation, the method may include adjusting the rendered image based on the second estimation of the predicted gaze point and transmitting the adjusted image to the display device for display.

20 Claims, 6 Drawing Sheets

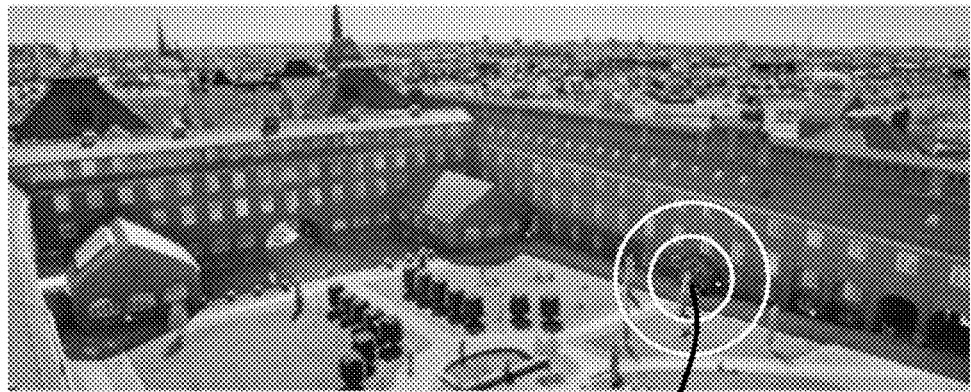
*FIG. 4A*    402
*FIG. 4B*    402  404
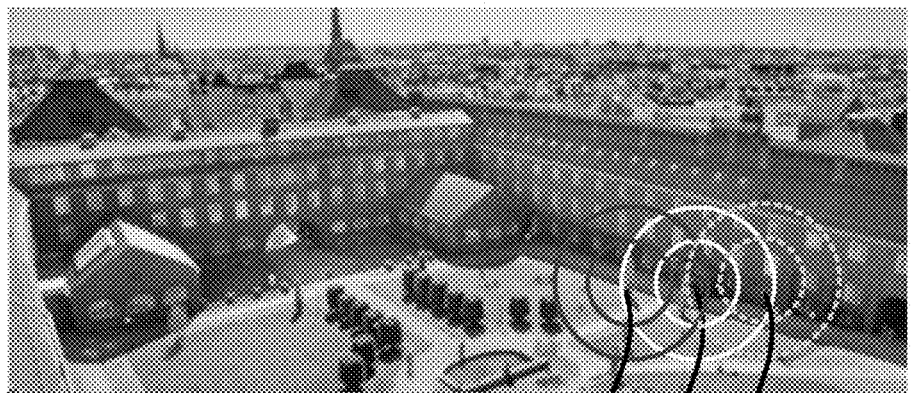
*FIG. 4C*    402  404  406

IMAGE RE-PROJECTION FOR FOVEATED RENDERING

BACKGROUND

Rendering and displaying a computer-generated scene on a display has increased in importance in areas such as gaming, modeling, and movies. Rendering is a computationally expensive process in which the entire scene's spatial, textural, and lighting information are combined to determine the color value of each pixel in the rendered image. Graphics processing devices performing the rendering, however, have limited processing power and memory capacity. These limits make the rendering of the scene, especially real-time rendering, a challenging task.

To speed up the rendering process, foveated rendering is sometimes employed. Foveated rendering uses an eye tracker to reduce the rendering workload based on the observation that human vision typically focuses on the portion of the screen near the gaze point whereas the visual acuity drops dramatically in the peripheral vision (i.e. the area outside of the zone gazed by the fovea). In foveated rendering, the content in an area near the gaze point of a user, also referred to herein as a "foveated region," is rendered with high quality, whereas the content outside the foveated region, referred to as "non-foveated region," is rendered with lower quality. As the user's gaze point moves, the images are re-rendered accordingly to match the new location of the gaze point.

However, the high-quality area of the rendered image displayed to a user does not always match the foveated region of the user. Reasons for this mismatch include the latency introduced by the rendering process, and the latency and inaccuracy in the gaze point estimation, especially in scenarios where saccade or blinking has occurred. As a result, the image rendered and displayed to a user was generated based on a gaze point estimated for the user tens of milliseconds ago. Consequently, the content that is projected to the user's foveated region at the time of display may be rendered in low quality causing unpleasant experience to the user.

BRIEF DESCRIPTION

In some embodiments, a method for improving the position of an image to be displayed is provided. The method may include receiving a first estimation of a predicted gaze point of a user on a display device at the time when the image will be displayed. The first estimation of the predicted gaze point is determined before the start of rendering a portion of the image related to the first estimation of the predicted gaze point. The method may further include causing the image, including the portion of the image, to be rendered based on the first estimation of the predicted gaze point. The method may also include receiving a second estimation of the predicted gaze point at the time when the image will be displayed. The second estimation of the predicted gaze point is determined after rendering of the portion of the image has started. The method may further include in response to determining that the second estimation of the predicted gaze point is different from the first estimation of the predicted gaze point, adjusting the rendered image based on the second estimation of the predicted gaze point and transmitting the adjusted rendered image to the display device for display.

In another embodiment, a computing system for improving the position of an image to be displayed is provided. The computing system may include a non-transitory computer-readable medium storing program code of an image processing application, and a processing device communicatively coupled to the non-transitory computer-readable medium. The processing device may be configured to execute the program code and perform operations that include receiving a first estimation of a predicted gaze point of a user on a display device at the time when the image will be displayed. The first estimation of the predicted gaze point is determined before the start of rendering a portion of the image related to the first estimation of the predicted gaze point. The operations may further include causing the image, including the portion of the image, to be rendered based on the first estimation of the predicted gaze point. The operations may further include receiving a second estimation of the predicted gaze point at the time when the image will be displayed. The second estimation of the predicted gaze point is determined after rendering of the portion of the image has started. The operations may further include, responsive to determining that the second estimation of the predicted gaze point is different from the first estimation of the predicted gaze point, adjusting the rendered image based on the second estimation of the predicted gaze point and transmitting the adjusted rendered image to the display device for display.

In another embodiment, a non-transitory machine readable medium having instructions thereon for improving the position of an image to be displayed is provided. The instructions may be executable by one or more processors to perform operations that may include receiving a first estimation of a predicted gaze point of a user on a display device at the time when the image will be displayed. The first estimation of the predicted gaze point is determined before the start of rendering a portion of the image related to the first estimation of the predicted gaze point. The operations may further include causing the image, including the portion of the image, to be rendered based on the first estimation of the predicted gaze point. The operations may further include receiving a second estimation of the predicted gaze point at the time when the image will be displayed. The second estimation of the predicted gaze point is determined after rendering of the portion of the image has started. The operations may further include responsive to determining that the second estimation of the predicted gaze point is different from the first estimation of the predicted gaze point, adjusting the rendered image based on the second estimation of the predicted gaze point and transmitting the adjusted rendered image to the display device for display.

BRIEF DESCRIPTION OF THE DRAWINGS

The subject matter of the present disclosure is described in conjunction with the appended figures:

FIGS. 4A-C illustrate examples of images generated during the foveated rendering, according to embodiments presented herein;

Figure 1:
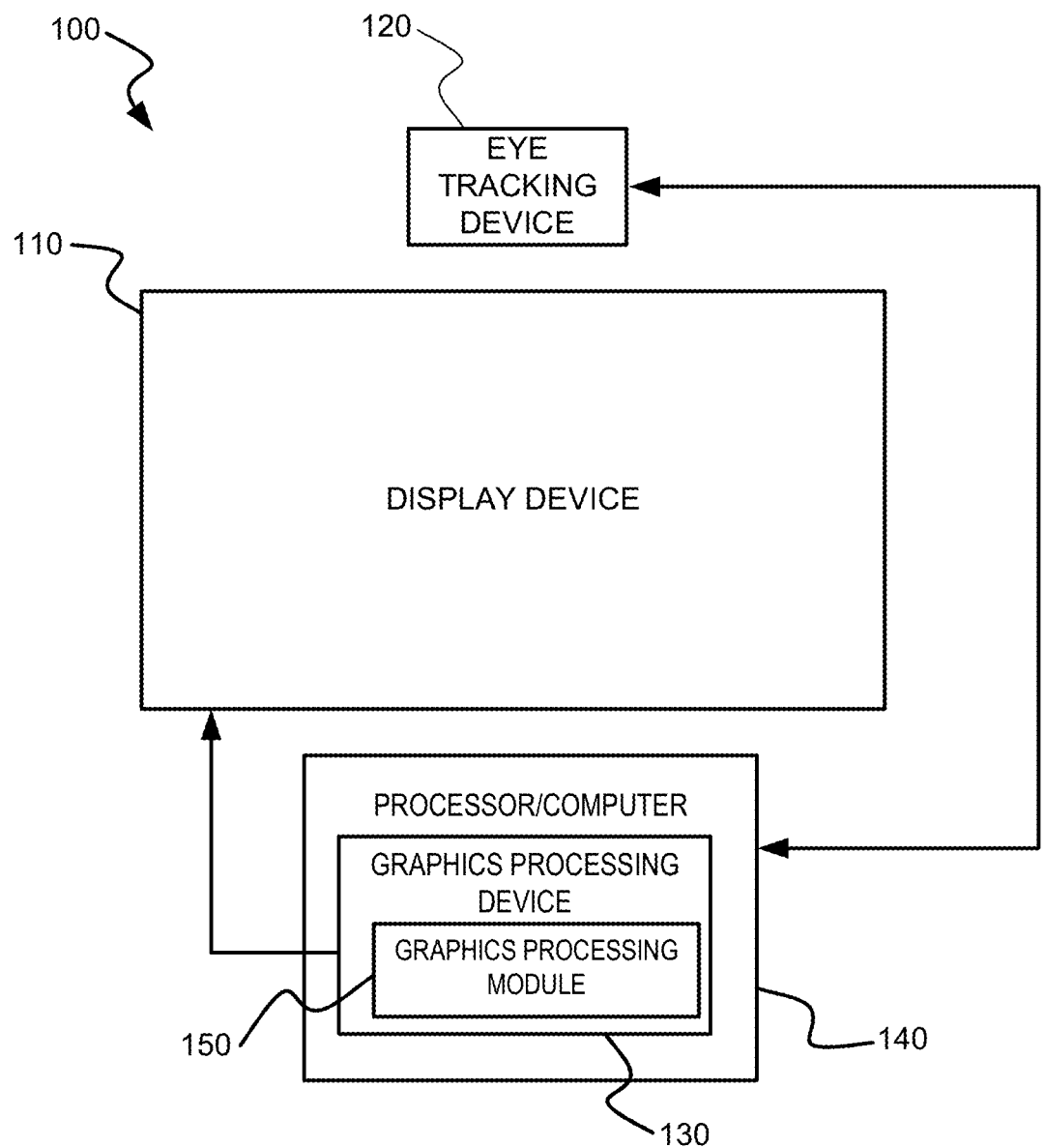
FIG. 1 is a block diagram of one possible system for improving foveated rendering through image re-projection, according to embodiments presented herein.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Embodiments for improving foveated rendering through image re-projection are disclosed. In an example, a graphics processing device receives a first estimation of a predicted gaze point of a user on a display device. Based on the first estimation of the predicted gaze point, the graphics processing device implements or cause to be implemented foveated rendering by generating a high-quality portion of the image corresponding to a foveated region containing the first estimation of the predicted gaze point of the user, and the remaining part of the image for the non-foveated region. The estimation of the predicted gaze point of the user is determined before the start of rendering the high-quality portion of the image. After rendering the high-quality portion of the image has started, the graphics processing device receives a second estimation of the predicted gaze point of the user. The graphics processing device determines if the second estimation of the predicted gaze point of the user is the same as the first estimation. If not, the graphics processing device adjusts the rendered image by re-projecting the rendered image based on the second estimation of the predicted gaze point. As a result, the high-quality portion of the image of the adjusted rendered image may contain the second estimation of the predicted gaze point. Further, the adjusted rendered image does not cause noticeable artifacts to the user because human eyes typically do not notice the change to the rendered image when the user is changing gaze point. As such, the foveated rendering via image re-projection presented herein can be applied after a saccade or a blink of the user. The adjusted rendered image is then transmitted to the display device for display.

The technologies presented herein improves the performance of the graphics processing device by reducing the mismatch between the foveated region and the high-quality portion of the rendered image generated via foveated rendering. This thereby improves the quality of the image displayed to the user. This further allows the graphics processing device to reduce the computing resource consumptions by taking advantage of the foveated rendering. In other words, without the technologies presented herein, the graphics processing device may not use foveated rendering due to the mismatch between the high-quality portion of the rendered image and the actual gaze point of the user. As a result, the technologies presented herein enables the reduction of the overall computational resource consumption of the system by using the foveated rendering without causing noticeable artifacts.

The ensuing description provides exemplary embodiments only and is not intended to limit the scope, applicability or configuration of the disclosure. Rather, the ensuing description of the exemplary embodiments will provide those skilled in the art with an enabling description for implementing one or more exemplary embodiments. It is understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the present disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function. Any detail present in one discussed embodiment may or may not be present in other versions of that embodiment or other embodiments discussed herein.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments presented herein may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In some embodiments, and with reference to FIG. 1, a system 100 for presenting graphics or images on a display device 110 is provided. The system 100 may include an eye tracking device 120 and a graphics processing device 130. In some embodiments, the system may also include a computing device 140 which communicates with, and controls, a graphics processing device 130. In some embodiments, any function of the graphics processing device 130 may be performed, in whole or in part, by a computing device 140. Part of the function of the graphics processing device 130 may also be performed by another computing device or on the cloud. Merely by way of example, the eye tracking device 120 may be provided integral to, or in addition to, a personal computer 140 having a graphics processing device 130 and a central processing unit (in some configurations, the graphics processing device 130 and the central processing unit are integrated).

In other embodiments, the eye tracking device 120 may be provided integral to, or in addition to, a gaming console 140 or other device having a graphics processing device 130 and a central processing unit. In other embodiments, the eye tracking device 120 may be provided integral to, or in addition to, a wearable headset such as a Virtual Reality (VR) or Augmented Reality (AR) or the like. Likewise, the display device 110 may also be a display device integral to a wearable headset and the processor 140 may also be integral to the wearable headset. The system 100 can thus be a wearable headset with a head-mounted display (HMD). Thus, embodiments presented herein may be applied to the presentation of graphics in any number of possible devices and applications, including a video display, video games, video production and editing, video communications, computer-aided drafting, and design, etc.

The eye tracking device 120 may be for determining at least one of a gaze point of a user on a display device 110, or a change in the gaze point of the user on display device 110. Eye tracking devices and methods, sometimes referred to as gaze detection systems and methods include, for example, products produced and available from Tobii AB, and which operate by using infrared illumination and an image sensor to detect reflection from the eye of a user. An example of such a gaze detection system is described in U.S. Pat. No. 7,572,008, which is hereby incorporated by reference, for all purposes, as if fully set forth herein. Other alternative gaze detection systems may also be employed, regardless of the technology behind the gaze detection system. The eye tracking device 120 may employ its own processor or the processor of another device (i.e., the computing device 140) to interpret and process data received. When an eye tracking device is referred to herein, both possible methods of processing data are referred to.

In some embodiments, the graphics processing device 130 renders the computer-generated scene, such as three-dimensional (3D) scene, into images and send the rendered images to the display device 110 for display. The graphics processing device 130 can employ foveated rendering based at least in part on the gaze point of the user on display device 110, or a change in the gaze point of the user on display device 110, as determined by eye tracking device 120. The graphics processing device 130 may further include a graphics processing module 150 for processing the rendered images, such as combining high quality portion and low quality background image in foveated rendering or perform other post-processing operations on the rendered image. In some embodiments, the graphics processing module 150 also performs the image re-projection mechanism before the rendered image is sent to the display device 110. The image rendering may also be performed by another computing device locally or over the cloud and then the rendered image is sent to the display device 110 through a wired or wireless connection. While in some embodiments a separate non-included or non-integrated display device will be controlled by the graphics processing device 130, other embodiments may include or integrate the display device 110.

Figure 2A:
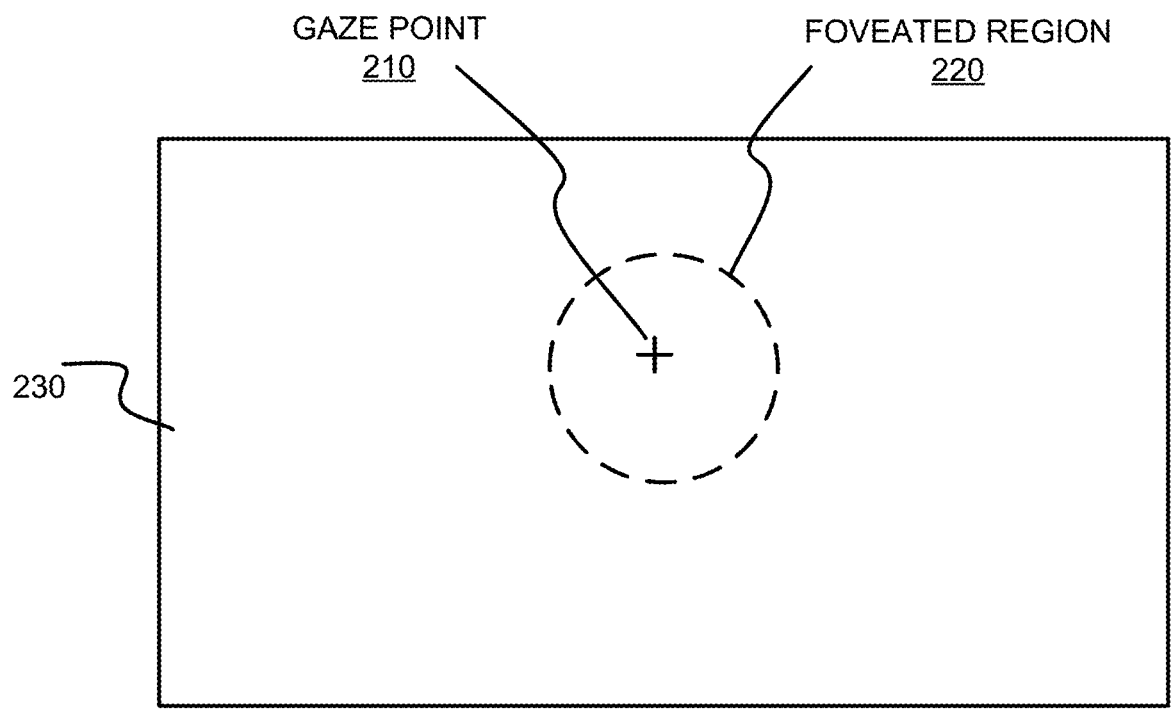
FIG. 2A depicts an example of a view of a display device in which an image generated using foveated rendering is displayed.

The way in which the graphics processing device 130 implements the foveated rendering may vary depending on the embodiments. FIG. 2A illustrates one embodiment of the foveated rendering, which shows a display device 110, a user's gaze point 210 on the display device 110 and the foveated region 220 around user's gaze point 210 in which the graphics processing device 130 may display an image having a quality higher than the remaining region 230 of the display device 110, also referred to as "non-foveated region 230". In one embodiment, the graphics processing device 130 renders the image for the foveated region 220 with a high sampling rate while rendering the image for the non-foveated region 230 with a low sampling rate. As a result, the image for the non-foveated region 230 can be generated with a low resolution, and the image for the foveated region 220 can be generated with a high resolution. In this manner, available resources of the graphics processing device 130, and/or other system resources, can be utilized efficiently without scarifying the overall visual quality of the displayed image.

It should be appreciated that while the foveated region 220 illustrated in FIG. 2A is has a circular shape, the foveated region 220 can have any regular or irregular shapes, such as oval, square, rectangular, or polygonal, and so on. Further, in addition to using different sampling rates or resolutions for the foveated region 220 and the non-foveated region 230, the quality of these two regions can be made different in other aspects, such as contrast, shading, texture mapping, bump mapping, shadows, reflection, frame rate, post processing effects quality, refraction quality, three-dimensional object quality, and so on.

Figure 2B:
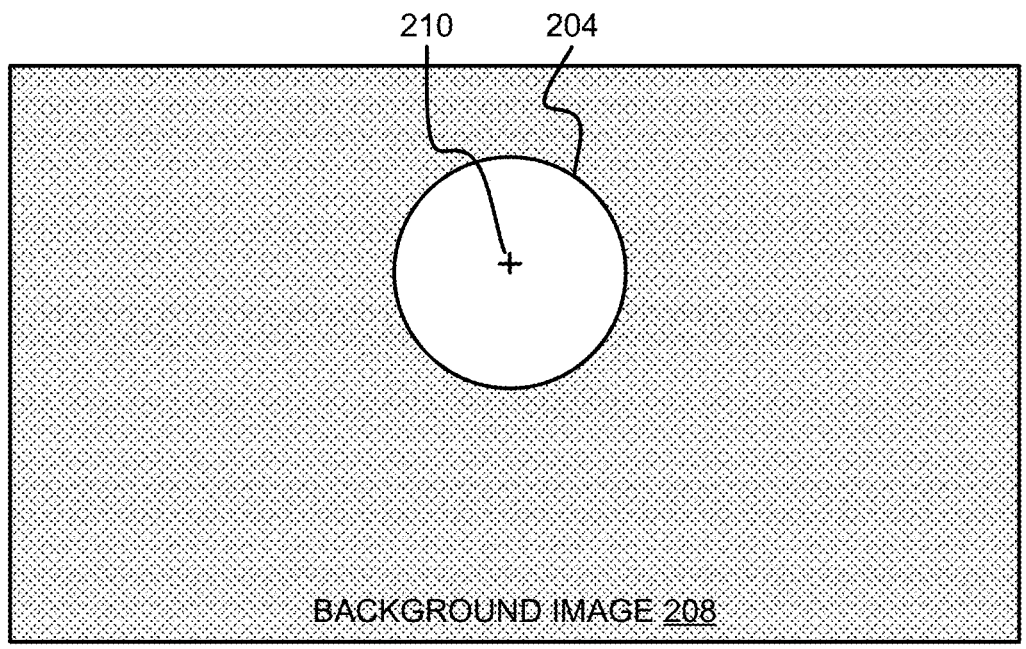
FIG. 2B is a diagram illustrating an example of foveated rendering, according to embodiments presented herein.

FIG. 2B illustrates an example of foveated rendering using different quality, such as the sampling rates, for foveated region 220 and non-foveated region 230, according to an embodiment of the present disclosure. In this example, the foveated rendering involves generating a background image 208 with low quality and a high-quality foreground image 204, also referred to herein as a high-quality image, a high-quality area or a high-quality portion. Using sampling rate as an example, the background image 208 can be generated using a sampling rate that is half of the sampling rate of an image generated for the display device without foveated rendering, referred to herein as "full image". As a result, the background image 208 has a dimension that is half of the full image in both horizontal and vertical directions. The high-quality foreground image 204 can have a same or similar sampling rate as the full image, but smaller dimensions than the full image or the display region of the display device 110.

In an example, the background image 208 corresponds to the entire content of the full image or the entire display region. In comparison, the high-quality foreground image 204 corresponds to a foveated region 220. The foveated rendering further includes combining the background image 208 and the high-quality foreground image 204 to generate a composite image 206. The combination includes overlaying the high-quality foreground image 204 on top of the background image 208 depending on the location of the gaze point 210 and the foveated region 220. The composite image 206 is presented in the image display region of the display. Accordingly, rather than presenting the full image, the composite image 206 is presented, where only the foreground image 204 is presented at a high quality and the remaining parts of the composite image is presented at low quality. Additional operations might be performed during the combining process, such as blending the image content near the border of high-quality foreground image 204 to smooth out the transition between the low- and high-quality parts.

Figure 3:
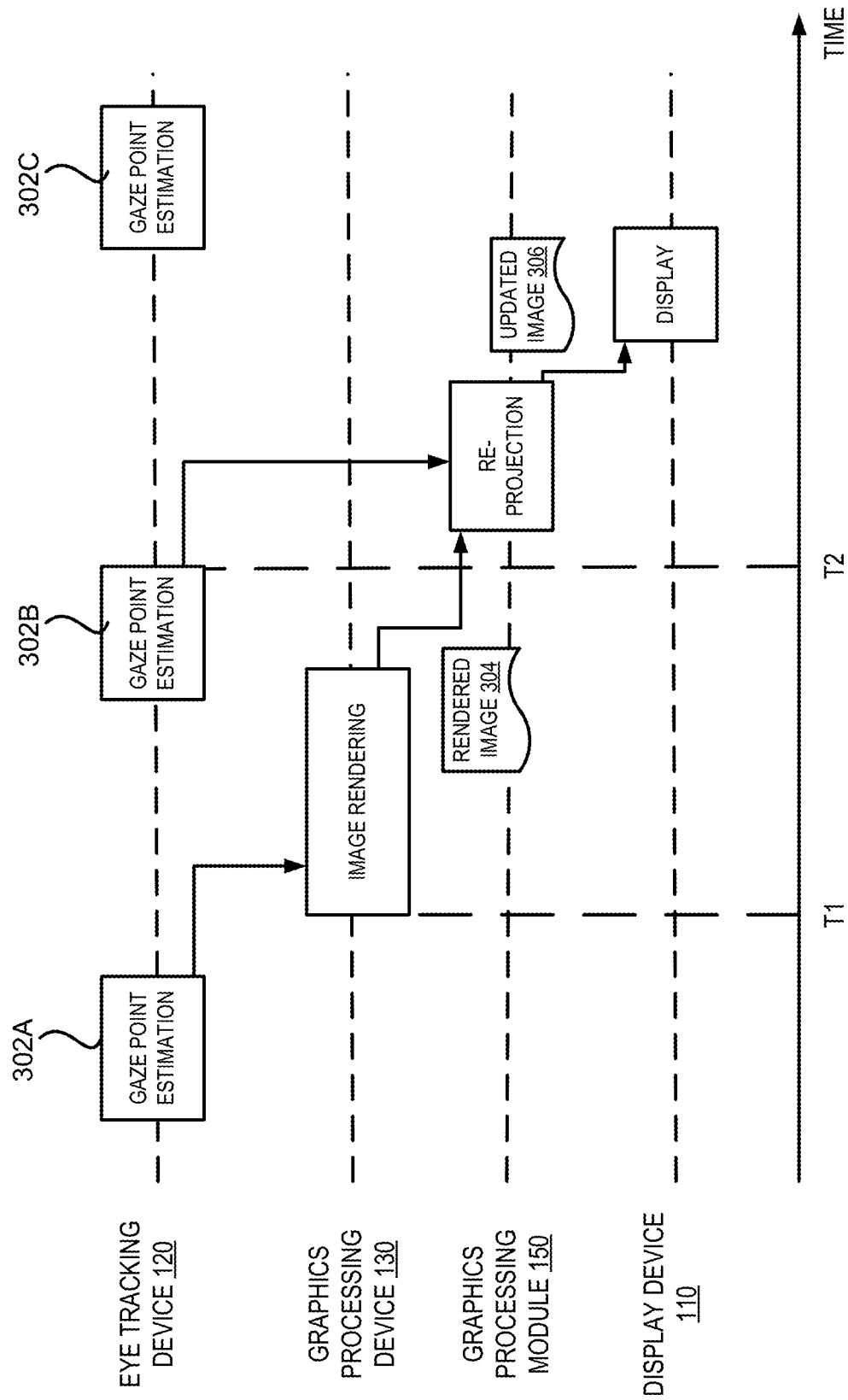
FIG. 3 is a diagram illustrating an example of image re-projection to improve foveated rendering, according to embodiments presented herein.

FIG. 3 is a diagram illustrating an example of image re-projection to improve foveated rendering. In the example shown in FIG. 3, the eye tracking device 120 performs gaze point estimation from time to time. For example, the eye tracking device 120 may generate an estimation of the predicted gaze point at the time when the image will be displayed, also referred to as a "gaze point estimation," for every 1-50 ms, preferably 1-10 ms. The estimations of the predicted gaze points can be based on information of prior gaze point estimations, such as the latest gaze point estimation and the prediction of gaze movement. The prediction of the gaze movement can be based on previous gaze point estimations, information regarding gaze movement such as saccade velocity, expected point of interest, and so on.

At time T1, the graphics processing device 130 starts to render an image using foveated rendering, for example, for a 3D scene in a game or a VR environment. At some time during the rendering process, the graphics processing device 130 starts to render the high-quality portion of the image. The graphics processing device 130 can utilize the latest gaze point estimation 302A as the best estimation of the predicted gaze point to generate a rendered image 304. It should be noted that the latest gaze point estimation 302 may be determined after T1, i.e. the rendering of the image has started, but before the rendering of the high-quality portion of the image has started. FIG. 4A shows an example of a rendered image where the white circle indicates the high-quality portion generated for the foveated region based on the gaze point estimation 302A. In the example shown in FIG. 4A, the portion of the image corresponding to the foveated region is rendered with a high resolution, whereas the rest of the image is generated with a low resolution.

As discussed above, the image rendering process can be complicated and may take a non-trivial amount of time. During the rendering process, the estimation of the user's gaze point might have moved to a different location from what was indicated in the gaze point estimation 302A. As a result, it is likely that the high-quality portion of the rendered image 304 does not correspond to the actual foveated region of the user when the rendered image 304 is displayed. FIG. 4B shows an example of the mismatch between the high-quality portion of the rendered image 304 and the actual foveated region. In FIG. 4B, the dark circle shows the foveated region based on the gaze point estimation 302A used in the foveated rendering, and the white circle shows the actual foveated region based on the last estimate of the gaze point of the user. As can be seen from FIG. 4B, due to the mismatch, the high-quality portion of the rendered image is rendered at a wrong location, and part of the image that is projected onto the user's fovea may have low quality.

To address this issue, the graphics processing module 150 can utilize the latest output of the eye tracking device 120 to modify the rendered image 304. During the image rendering process or after image rendering process but before the display of the rendered image, such as time T2 shown in FIG. 3, the eye tracking device 120 might also have generated a new gaze point estimation 302B. Compared with the previous (first) gaze point estimation 302A, this new (second) gaze point estimation 302B may be closer to the actual gaze point of the user when the rendered image is displayed to the user. In particular, the graphics processing module 150 can re-project the rendered image 304 based on the latest gaze point estimation 302B to generate an updated image 306.

The re-projection can be performed such that the high-quality portion of the updated image 306 corresponds to the foveated region indicated by the latest gaze point estimation 302B. The re-projection is thus determined by the latest gaze point estimation 302B and the previous gaze point estimation 302A. The re-projection can be performed by any warping techniques known in the art, such as the asynchronous time warp (ATW) or image shifting. FIG. 4C shows an example of the updated image 306 by re-projecting the rendered image 304 according to the latest gaze point estimation 302B. In this example, the re-projection shifts the entire image to the right so that the high-quality portion of the rendered image 304, i.e. the portion showing a door, matches the foveated region based on the latest gaze point estimation 302B. The updated image 306 is then transmitted to the display device 110 for display. Since the updated image 306 is generated by taking into account the latest gaze point estimation 302B, the high-quality portion of the updated image 306 would likely match the foveated region of the user when the image is being displayed.

In some scenarios, however, the difference between the latest (second) gaze point estimation 302B and the first gaze point estimation 302A used for rendering the image is so large that the re-projection cannot be performed without introducing noticeable artifacts to the updated image 306. For example, a saccade or a blink of the user can cause a large difference between the gaze point estimations 302A and 302B. In another example, estimation errors occurred in either of the gaze point estimations 302A and 302B may also cause a large difference between the gaze point estimations 302A and 302B. To avoid introducing noticeable artifacts in the updated image 306, the graphics processing module 150 compares the difference between the gaze point estimations 302A and 302B with a threshold value. The difference can be calculated as the distance between the two gaze point estimations 302A and 302B. If the difference is higher than or equal to the threshold, the rendered image 304 is transmitted to the display device 110 for display without re-projection.

If the difference is lower than the threshold, the graphics processing module 150 may update the rendered image 304 by re-projecting the rendered image 304 based on the latest gaze point estimation 302B. In some examples, the re-projection can be performed to minimize or reduce the distance between the center point of the high-quality portion of the image and the latest gaze point estimation 302B. For example, the minimization or reduction may be performed to reduce the distance between the center point of the high-quality portion of the image and the latest gaze point estimation 302B to 0 or by 50% to 90%. The minimization or reduction may be subject to certain constraints. The constraints can be set based on various factors such as user preferences, allowed re-projection distance, and so on. Likewise, the threshold can also be determined based on these factors.

In further embodiments, after the image is re-projected, the graphics processing module 150 may further generate a third gaze point estimation based on gaze point estimation 302A (the first gaze point estimation) and gaze point estimation 302B (the second gaze point estimation). Generating the third gaze point estimation is based on the fact that the re-projection shifted the image and the user does not see the content that the user is supposed to see at the current gaze point. As a result, the user has the tendency of moving the gaze point towards the location of the display where the content, which corresponds to the second gaze point estimation before the re-projection of the image, is shown, after the re-projection of the image. In the example shown in FIG. 4B, the first gaze point estimation is gaze point 402, and the second gaze point estimation is gaze point 404. Without the re-projection, the user is supposed to see the window area by looking at the gaze point 404. With the re-projection, the user sees the door area by looking at the gaze point 404, rather than the window area.

When the user realizes that he does not see the window area by looking at the gaze point 404, the user is likely to move his eyes towards the window area, shown as the third gaze point 406 in FIG. 4C. Based on this observation, the graphics processing module 150 may, in one example, calculate the third estimation as $G_3=G_2+(G_2-G_1)$, wherein $G_1$, $G_2$, $G_3$ are the first gaze point estimation 402, second gaze point estimation 404 and third gaze point estimation 406, respectively. In another example, the graphics processing module 150 may calculate the third gaze point estimation to be at a point between the second gaze point estimation $G_2$ and the $G_3$ calculated as above. The choice of the way to calculate the third gaze point estimation can be based on factors such as the image updating frequency, distance between the first estimation of the gaze point and the second estimation of the gaze point, estimated reaction time and saccade velocity of the user when realizing that the user is looking at the door area, rather than the window area as was intended.

At the time the third estimation of the predicted gaze point is performed at the graphics processing module 150, it is also likely that the graphics processing module 150 has received updated information regarding gaze point from the eye tracking device 120. In that case, the graphics processing module 150 can combine the gaze point estimation from the eye tracking device 120 and the third estimation obtained as described above. The obtained third estimation of the predicted gaze point can be utilized for generating the next rendered image, for example, by sending the third estimation of the predicted gaze point to the graphics processing device 130 to perform the foveated rendering for the next image.

Although in the above, the image re-projection is described as a standalone process, it can be combined with an existing re-projection or warping process. For example, the system 100 can include a wearable headset such as a VR headset or AR headset that implements an image warping on rendered images based on the latest reading of head pose. In these examples, the re-projection can be combined with the image warping to have both the head pose and the gaze point estimation as input to the warping process. In some examples, the head pose and the gaze point estimations can be assigned different weights to adjust the relative importance between these two inputs. In other examples, one direction of warping, such as the vertical direction, is determined based on the head pose estimation, and the other direction, such as the horizontal direction, is determined based on the gaze point estimation. Other ways of combining different inputs to the re-projection process can also be utilized.

It should be understood that although FIG. 3 shows one gaze point estimation is generated after the image rendering process starts, it is possible that multiple gaze point estimations have been generated since the start of the image rendering process. In this case, the graphics processing module 150 utilizes the latest gaze point estimation from the multiple gaze point estimations to perform the re-projection. It is also possible that no new gaze point estimation is generated after the rendered image 304 is generated, in which case the rendered image 304 is transmitted to display device 110 without image re-projection.

Figure 5:
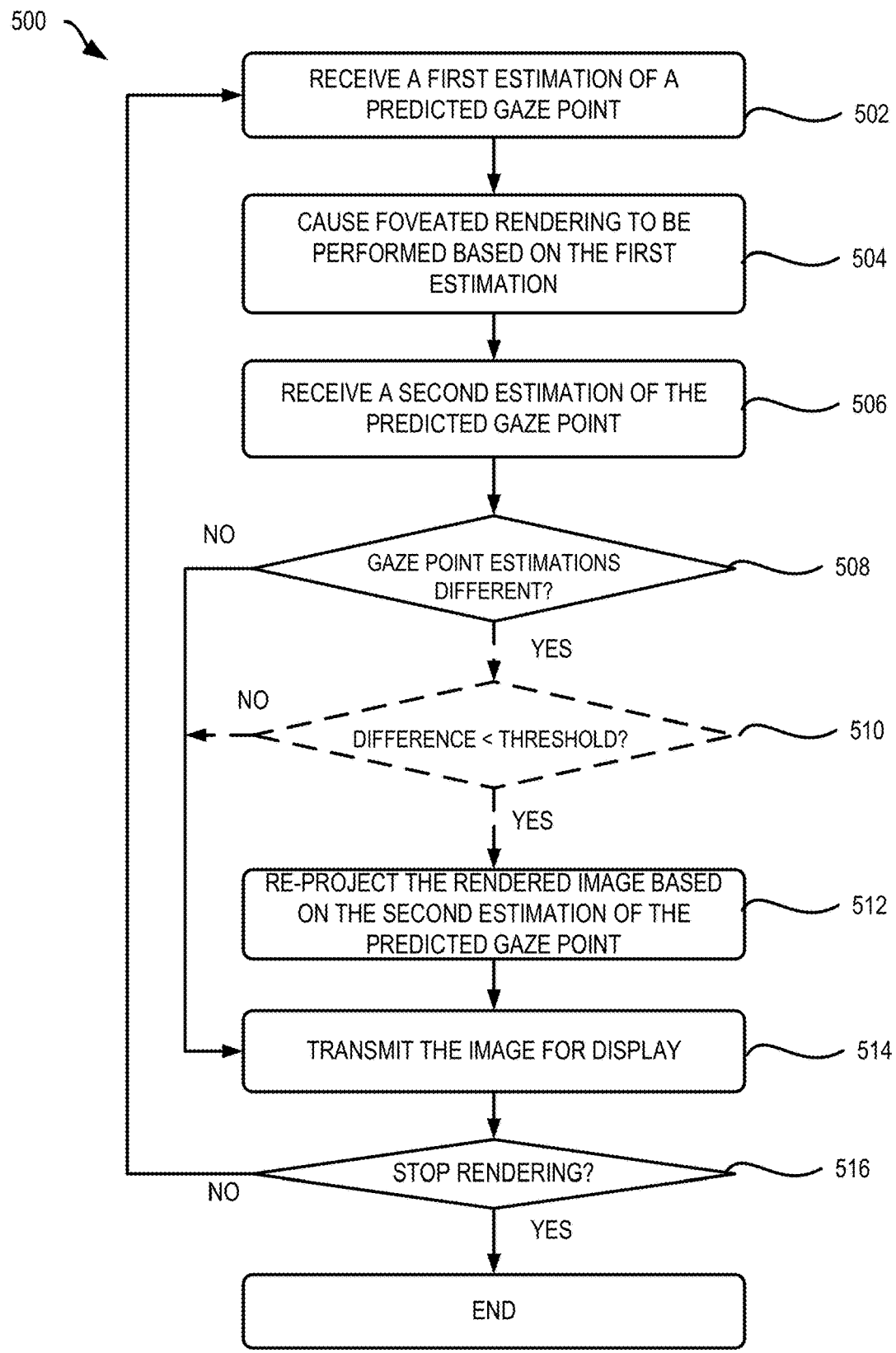
FIG. 5 is a flow diagram of one example method for improving foveated rendering through image pre-projection, according to embodiments presented herein.

FIG. 5 is a flow diagram of one example method 500 for improving foveated rendering through image pre-projection, according to embodiments presented herein. One or more computing devices (e.g., the computing device 140 or more specifically the graphics processing device 130) implements operations depicted in FIG. 5 by executing suitable program code (e.g. the graphics processing module 150). For illustrative purposes, the method 500 is described with reference to certain examples depicted in the figures. Other implementations, however, are possible.

At block 502, the method 500 involves receiving a first estimation of a predicted gaze point of a user on a display device 110 when the rendered image will be displayed. As discussed above, the gaze data can be generated by an eye tracking device 120 that may be separate from or integrated into the computing device 140. At block 504, the method 500 involves performing or causing to be performed foveated rendering of an image 304 based on the first estimation of the predicted gaze point. The rendering can be performed by the graphics processing device 130 or another computing device that is communicatively connected to the graphics processing device 130.

At block 506, the method 500 involves receiving a second estimation of the predicted gaze point from the eye tracking device 120. At block 508, the method 500 involves comparing the second estimation of the predicted gaze point with the first estimation to determine if there is any difference between these two estimations. If so, in some embodiments, the method 500 proceeds to block 510, which is an optional block, where the graphics processing device 130 compares the difference with a threshold value. If the difference between the two estimations is lower than the threshold, the method 500 further proceeds to block 512. At block 512, the graphics processing device 130 re-projects the rendered image 304 based on the second estimation of the predicted gaze point to generate an updated image 306. At block 514, the graphics processing device 130 transmits the updated image 306 to the display device 110 for display.

If, at block 508, it is determined that the second estimation of the predicted gaze point and the first estimation are the same, or at block 510, it is determined that the difference between the two estimations is higher than or equal to the threshold value, the method 500 proceeds to block 514. At block 514, the graphics processing device 130 transmits the rendered image 304 to the display device 110 for display.

At block 516, the method 500 involves determining if the rendering should be stopped. For example, the user has instructed to stop the image rendering. If not, the method 500 returns to block 502, where the graphics processing device 130 receives a new estimation of the predicted gaze point for foveated rendering. If it is determined at block 516 that the rendering process should be stopped, the method 500 ends.

Figure 6:
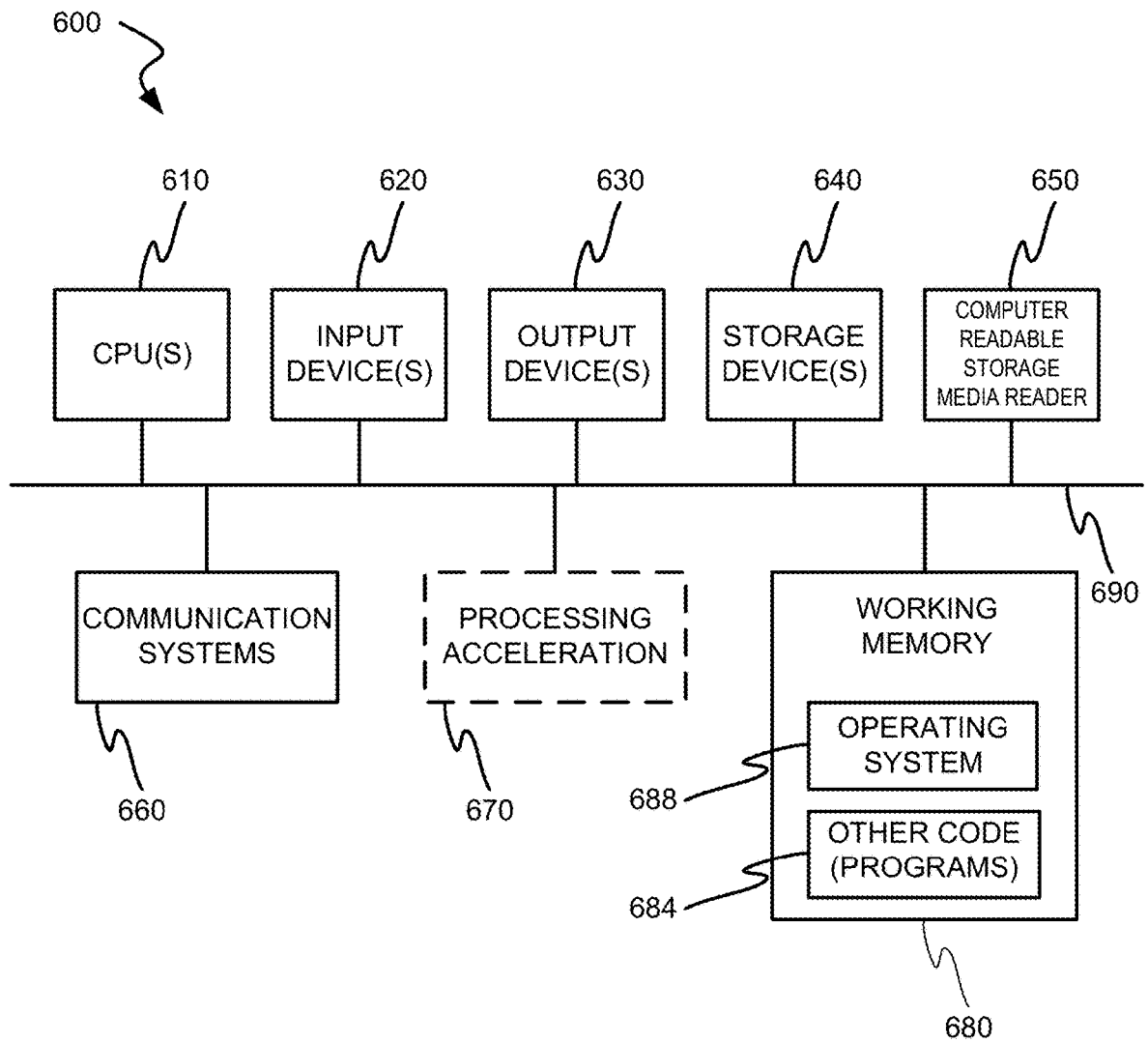
FIG. 6 is a block diagram of an exemplary computer system capable of being used in at least some portion of the devices or systems of the present disclosure, or implementing at least some portion of the methods of the present disclosure.

FIG. 6 is a block diagram illustrating an exemplary computer system 600 in which embodiments presented herein may be implemented. This example illustrates a computer system 600 such as may be used, in whole, in part, or with various modifications, to provide the functions of the eye tracking device 120, the graphics processing device 130, the game console, the computing device 140, and/or other components discussed above. For example, various functions of the eye tracking device 120 and associated processors may be controlled by the computer system 600, including, merely by way of example, tracking a user's gaze point, determining an anticipated gaze point, controlling the graphics processing device 130, etc.

The computer system 600 is shown comprising hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). The computer system 600 may also include one or more storage device 640. By way of example, storage device(s) 640 may be disk drives, optical storage devices, a solid-state storage device such as a random access memory ("RAM") and/or a read-only memory ("ROM"), which can be programmable, flash-updateable and/or the like.

The computer system 600 may additionally include a computer-readable storage media reader 650, a communications system 660 (e.g., a modem, a network card (wireless or wired), an infra-red communication device, Bluetooth™ device, cellular communication device, etc.), and working memory 680, which may include RAM and ROM devices as described above. In some embodiments, the computer system 600 may also include a processing acceleration unit 670, which can include a digital signal processor, a special-purpose processor and/or the like.

The computer-readable storage media reader 650 can further be connected to a computer-readable storage medium, together (and, optionally, in combination with storage device(s) 640) comprehensively representing remote, local, fixed, and/or removable storage devices plus storage media for temporarily and/or more permanently containing computer-readable information. The communications system 660 may permit data to be exchanged with a network, system, computer and/or other component described above.

The computer system 600 may also comprise software elements, shown as being currently located within a working memory 680, including an operating system 684 and/or other code 688. It should be appreciated that alternate embodiments of a computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 600 may include code 688 for implementing any or all of the function of the various elements of the architecture as described herein. For example, software, stored on and/or executed by a computer system such as system 600, can provide the functions of the eye tracking device 120, the graphics processing device 130, the game console, the processor/computer, and/or other components such as those discussed above. Methods implementable by software on some of these components have been discussed above in more detail.

The technology presented herein has now been described in detail for the purposes of clarity and understanding. However, it will be appreciated that certain changes and modifications may be practiced within the scope of the appended claims.

What is claimed is:

1. A method for improving a position of an image to be displayed, the method comprising:
   receiving, by a processing device, a first estimation of a predicted gaze point, of a user on a display device, at a time when the image will be displayed, the first estimation of the predicted gaze point being determined before a start of rendering a portion of the image related to the first estimation of the predicted gaze point;
   causing, by the processing device, the image, including said portion of the image, to be rendered based on the first estimation of the predicted gaze point;
   receiving, by the processing device, a second estimation of the predicted gaze point at the time when the image will be displayed, the second estimation of the predicted gaze point is determined after rendering of said portion of the image has started; and
   responsive to determining that the second estimation of the predicted gaze point is different from the first estimation of the predicted gaze point,
      adjusting the rendered image based on the second estimation of the predicted gaze point, and
      transmitting the adjusted rendered image to the display device for display.

2. The method of claim 1, wherein said portion of the image corresponds to a foveated region on the display device that contains the first estimation of the predicted gaze point of the user.

3. The method of claim 1, wherein adjusting the rendered image comprises adjusting the rendered image so that said portion of the image is re-projected to correspond to a foveated region on the display device that comprises the second estimation of the predicted gaze point.

4. The method of claim 1, wherein adjusting the rendered image comprises adjusting the rendered image so that a distance between the second estimation of the predicted gaze point and a center point of said portion of the image is reduced.

5. The method of claim 1, wherein determining that the second estimation of the predicted gaze point is different from the first estimation of the predicted gaze point comprises:
   determining a difference between the second estimation of the predicted gaze point and the first estimation of the predicted gaze point; and
   determining that the difference is lower than a threshold.

6. The method of claim 5, further comprising:
   in response to determining that the difference is higher than the threshold, transmitting the rendered image to the display device for display without said step of adjusting the rendered image.

7. The method of claim 1, wherein the processing device is a part of a virtual reality device, and wherein re-projecting the rendered image is further based on a movement of the user wearing the virtual reality device.

8. A computing system comprising:
   a non-transitory computer-readable medium storing program code of an image processing application; and
   a processing device communicatively coupled to the non-transitory computer-readable medium, wherein the processing device is configured to execute the program code and thereby perform operations comprising:
      receiving a first estimation of a predicted gaze point, of a user on a display device, at a time when an image will be displayed, the first estimation of the predicted gaze point being determined before a start of rendering a portion of the image related to the first estimation of the predicted gaze point;
      causing the image, including said portion of the image, to be rendered based on the first estimation of the predicted gaze point;
      receiving a second estimation of the predicted gaze point at the time when the image will be displayed, the second estimation of the predicted gaze point is determined after rendering of said portion of the image has started; and responsive to determining that the second estimation of the predicted gaze point is different from the first estimation of the predicted gaze point, adjusting the rendered image based on the second estimation of the predicted gaze point, and transmitting the adjusted rendered image to the display device for display.

9. The computing system of claim 8, further comprising the display device, wherein the display device is a head-mounted display.

10. The computing system of claim 8, wherein said portion of the image corresponds to a foveated region on the display device that contains the first estimation of the predicted gaze point of the user.

11. The computing system of claim 8, wherein adjusting the rendered image comprises adjusting the rendered image so that said portion of the image is re-projected to correspond to a foveated region on the display device that comprises the second estimation of the predicted gaze point.

12. The computing system of claim 8, wherein adjusting the rendered image comprises adjusting the rendered image so that a distance between the second estimation of the predicted gaze point and a center point of said portion of the image is reduced.

13. The computing system of claim 8, wherein said portion of the image is rendered in a higher resolution than parts of the image outside said portion of the image.

14. The computing system of claim 8, wherein said portion of the image is rendered in higher contrast than parts of the image outside said portion of the image.

15. A non-transitory machine readable medium having instructions thereon for improving a position of an image to be displayed, the instructions executable by one or more processors to perform operations comprising:

receiving a first estimation of a predicted gaze point, of a user on a display device, at a time when the image will be displayed, the first estimation of the predicted gaze point being determined before a start of rendering a portion of the image related to the first estimation of the predicted gaze point;

causing the image, including said portion of the image, to be rendered based on the first estimation of the predicted gaze point;

receiving a second estimation of the predicted gaze point at the time when the image will be displayed, the second estimation of the predicted gaze point is determined after rendering of said portion of the image has started; and responsive to determining that the second estimation of the predicted gaze point is different from the first estimation of the predicted gaze point, adjusting the rendered image based on the second estimation of the predicted gaze point, and transmitting the adjusted rendered image to the display device for display.

16. The non-transitory machine readable medium of claim 15, wherein the operations further comprise generating a third estimation of the predicted gaze point based upon the second estimation of the predicted gaze point and the first estimation of the predicted gaze point.

17. The non-transitory machine readable medium of claim 16, wherein the operations further comprise:

causing a second rendered image to be generated based on the third estimation of the predicted gaze point, the second rendered image comprising a portion that corresponds to a foveated region on the display device containing the third estimation of the predicted gaze point.

18. The non-transitory machine readable medium of claim 15, wherein the display device is a head-mounted display of a virtual reality headset.

19. The non-transitory machine readable medium of claim 15, wherein said portion of the image corresponds to a foveated region on the display device that contains the first estimation of the predicted gaze point of the user.

20. The non-transitory machine readable medium of claim 15, wherein adjusting the rendered image comprises adjusting the rendered image so that said portion of the image is re-projected to correspond to a foveated region on the display device that comprises the second estimation of the predicted gaze point.

* * * * *